United States Patent
De Vries

Patent Number: 5,859,735
Date of Patent: Jan. 12, 1999

[54] OPTICAL ELEMENT AND DISPLAY DEVICE PROVIDED WITH SAID OPTICAL ELEMENT

[75] Inventor: Gosse C. De Vries, Eindhoven, Netherlands

[73] Assignee: U.S. Philips Corporation, New York, N.Y.

[21] Appl. No.: 800,445

[22] Filed: Feb. 18, 1997

[30] Foreign Application Priority Data

Mar. 14, 1996  [EP]  European Pat. Off. ............. 96200711

[51] Int. Cl.$^6$ ............................... G02B 5/22; G02F 1/01; H01J 31/00
[52] U.S. Cl. .......................... 359/885; 313/478; 313/479; 359/277
[58] Field of Search ..................... 359/885, 267, 359/277, 275, 584; 313/478, 479, 110; 348/817

[56] References Cited

U.S. PATENT DOCUMENTS

| | | | |
|---|---|---|---|
| 4,970,431 | 11/1990 | Vegter et al. | 313/634 |
| 5,060,075 | 10/1991 | Skinner | 358/250 |
| 5,539,276 | 7/1996 | Exell et al. | 313/486 |
| 5,694,001 | 12/1997 | Wielstra | 313/478 |

*Primary Examiner*—Cassandra C. Spyrou
*Assistant Examiner*—Audrey Chang
*Attorney, Agent, or Firm*—Norman N. Spain

[57] ABSTRACT

An optical element (8) is provided on a substrate, for example a display screen (3) of a display device (1), which optical element comprises a light-transmitting layer whose transmission in the visible region varies in response to a change in ambient light. The optical element (8) is characterized in that it further comprises a colored coating which selectively absorbs light in the visible region. The colored coating has such an absorption characteristic that the color coordinates (x;y) of the combination of the light-transmitting layer and the colored coating vary in such a way, as a result of a variation in ambient light, that a line, which interconnects the color coordinates, is partly situated in an elliptical area with achromatic point (0.333;0.333) in the color triangle, which ellipse comprises a major axis and a minor axis, which major axis terminates in (0.30;0.28) and (0.36;0.38) and the eccentricity of which ranges between 2 and 3. Preferably, the line is situated predominantly in the elliptical area. The invention is important, in particular, for optical elements which serve to reduce the transmission of light, and which comprise an electrochromic element or a photochromic element.

12 Claims, 4 Drawing Sheets

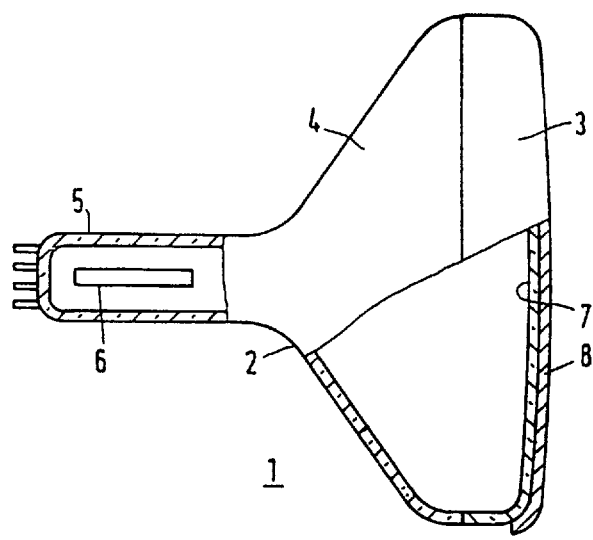 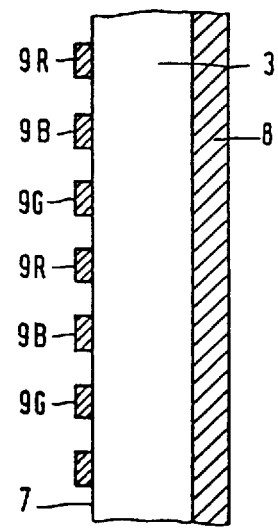
FIG.1A    FIG.1B
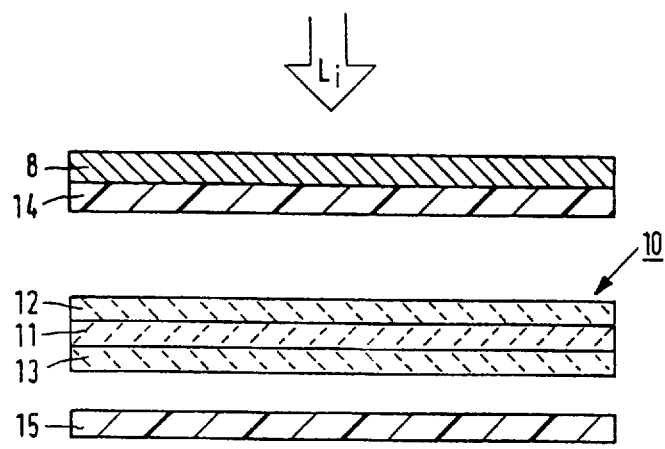
FIG.1C

OPTICAL ELEMENT AND DISPLAY DEVICE PROVIDED WITH SAID OPTICAL ELEMENT

BACKGROUND OF THE INVENTION

The invention relates to an optical element which is provided on a substrate and which comprises a light-transmitting layer, the transmission of said light-transmitting layer in the visible region varying in response to a change in ambient light.

The invention further relates to a display device which is provided with an optical element.

Optical elements for varying the transmission of light are used to influence the transmission and/or reflection of (visible) light, for example, of lamps, of rear view mirrors and of sunroofs for cars, or of windows for buildings ("smart windows"). They are also used, for example, in (flat-panel) display devices, such as cathode ray tubes (CRT) and liquid-crystal display devices (LCD, LC-TV and plasma-addressed LCD) to improve the contrast of the image reproduced.

Such layers reduce the intensity of reflected ambient light and the intensity of light originating from an (internal) light source, such as the phosphors in a CRT. Incident ambient light passes through the light-transmitting layer and is reflected at the display screen (for example at the phosphors), whereafter the reflected light passes through the light-transmitting layer again. If the transmission of the light-transmitting layer amounts to T, the intensity of the reflected ambient light decreases by a factor of $T^2$. Light originating from the internal light source(s), however, passes through the light-transmitting layer only once, so that the intensity of this light decreases only by a factor of T. The combination of these effects leads to an increase of the contrast by a factor of $T^{-1}$.

Examples of optical elements for varying the transmission of light include electrochromic elements and photochromic elements.

Oxides of specific transition metals are capable of accepting guest atoms such as hydrogen and alkali-metal atoms. If the oxide forms part of an electrochemical cell, the guest atoms can be accepted and released again in a reversible manner. In general, an electrochromic element comprises a first (transparent, conductive) electrode which is connected to the electrochromic layer, the so-called work electrode, and a second (transparent, conductive) electrode, the so-called counter electrode, which contains a material which serves as a source and as an acceptor for the guest atoms, and an ion-conducting (liquid, polymeric or solid) material, the so-called electrolyte, being present between said two electrodes. The transmission properties of the electrochromic element in the visible region undergo a change when a voltage difference is applied across the electrochromic element.

Such an electrochromic element is disclosed in U.S. Pat. No. 5,060,075 (PHA 40,577), in which the contrast of a luminescent image is increased by providing a front plate of an CRT display device with an electrochromic element, which reduces the reflection of ambient light if the brightness of said ambient light increases. A light sensor, which is provided in the vicinity of the front plate, detects variations in ambient light, and a control circuit, which is electrically connected to the light sensor and the panel, produces, while the display device is in operation, such a control signal that the degree to which the panel passes light decreases as a function of the increase of the intensity of ambient light.

A photochromic element comprises a layer which contains a material whose transmission varies (automatically) as a result of electromagnetic radiation, such as light, which is incident on the layer. A large number of photochromic materials, which can be placed in various categories (for example spiro-pyranes, spiro-oxazines or fulgides) are known from the relevant literature. Such a photochromic element enables, for example, the contrast of a (luminescent) image to be increased by providing a photochromic layer on the display screen of a display device, the local transmission of the layer in the visible region being governed by the radiation which is (locally) incident on the layer. The transmission of the photochromic element depends (preferably) on radiation which impinges on the layer and the wavelength of which is outside the range in which the display device emits light (for example in the so-called UV-A range) and said transmission decreases automatically as the intensity of the incident radiation increases.

Such optical elements often have the disadvantage that their transmission spectrum is not color neutral. As a result, ambient light is reflected in color, which is undesirable.

OBJECTS AND SUMMARY OF THE INVENTION

It is an object of the invention to provide an optical element in accordance with the opening paragraph, which has a color-neutral transmission spectrum.

To this end, the optical element in accordance with the invention is characterized in that said element further comprises a colored coating, which selectively absorbs light in the visible region, and which colored coating has such an absorption characteristic that color coordinates of the combination of the light-transmitting layer and the colored coating vary in such a way, as a result of a variation in ambient light, that a line, which interconnects the color coordinates (x;y) in an C.I.E. 1931 color triangle, is partly situated in an elliptical area with center or achromatic point (0,333;0,333) in the color triangle, which ellipse comprises a major axis and a minor axis, the major axis terminating in (0,30;0,28) and (0,36;0,38), and the ratio of the length of the major axis to the length of the minor axis ranging between 2 and 3.

The transmission of the light-transmitting layer varies as a result of a variation in ambient light. For every transmission characteristic of the light-transmitting layer, there is a corresponding color point in the C.I.E. 1931 color triangle, which color point is indicated by color coordinates (x;y), the third color coordinate z generally being omitted since z=1-x-y. In the C.I.E. color triangle, there is a line, which interconnects the color coordinates of the various transmission states, and which corresponds with the change in transmission characteristic of the light-transmitting layer as a result of the variation in ambient light. The known optical elements have a transmission spectrum which is not color neutral, so that the line of color coordinates (x;y) covers an area in the C.I.E. color triangle which does not coincide with the so-called "white" area, said "white" area being defined as an elliptical area with achromatic point (0.333;0.333) in the color triangle, said ellipse having a major axis and a minor axis, the major axis terminating in (0.30;0.28) and (0.36;0.38), and the ratio of the length of the major axis to the length of the minor axis ranging between 2 and 3.

By incorporating, apart from the light-transmitting layer, a colored coating into the optical element, which colored coating selectively absorbs light in the visible region, and by suitably choosing the absorption characteristic of the colored coating, color coordinates of the combination formed by the light-transmitting layer and the colored coating can vary, as a result of a variation in ambient light, in such a manner that the line which interconnects the color coordinates of the combination of the light-transmitting layer and the colored coating is partly situated in the "white" area as described hereinabove. In other words, the combination of the colored coating and the light-transmitting layer in the optical element in accordance with the invention leads to such a shift of the line interconnecting the color coordinates of the various transmission states of the light-transmitting layer, that this line extends, at least partly, in the desired "white" area. As a result of this shift, an optical element comprising a light-transmitting layer and a colored coating in accordance with the invention has a transmission spectrum with an improved color neutrality. In other words, the colored coating compensates for the non-neutral color of the ambient light reflected by the light-transmitting layer.

The optical element is preferably characterized in that the line, which interconnects the color coordinates (x;y) of the combination of the light-transmitting layer and the colored coating, is situated predominantly in the elliptical area.

A suitable choice of the transmission characteristic of the light-transmitting layer, so that the line interconnecting the color coordinates of the various transmission states of the light-transmitting layer covers a relatively limited area in the C.I.E. 1931 color triangle, for example an area whose shape corresponds substantially to the "white" area in the C.I.E. 1931 triangle, and whose surface is substantially of the same order of magnitude as said "white" area in the C.I.E. 1931 color triangle, enables the color neutrality of the optical element in accordance with the invention to be improved further. The incorporation of a colored coating in the optical element, a suitable absorption characteristic being chosen for said colored coating causes the line, which interconnects the color coordinates of the light-transmitting layer, to shift towards the "white" area in the C.I.E. 1931 color triangle.

A further embodiment of the optical element is characterized in that the line, which interconnects the color coordinates (x;y) of the combination of the light-transmitting layer and the colored coating, is partly situated in a further elliptical area with achromatic point (0.333;0.333) in the color triangle, the major axis of said further ellipse terminating in (0.315;0.305) and (0.345;0.355) and the ratio of the length of the major axis to the length of the minor axis ranging between 2.3 and 2.9. A further improvement of the color neutrality of the transmission characteristic of the optical element is achieved if the line, which interconnects the color-point coordinates of the combination of the light-transmitting layer and the colored coating, intersects said further elliptical area, preferably, if the line intersects the "white" point defined by the coordinates (0.333;0.333). The smaller the distance between the line, which interconnects the color-point coordinates (x;y) of the combination of the light-transmitting layer and the colored coating, and the "white" point, the higher the color neutrality of the transmission characteristic of the optical element is.

A further embodiment of the optical element is characterized in that the line, which interconnects the color coordinates (x;y) of the combination of the light-transmitting layer and the colored coating, is situated predominantly in the further elliptical area. A suitable choice of the transmission characteristic of the light-transmitting layer enables the color neutrality of the optical element in accordance with the invention to be improved further.

Preferably, the optical element is used in a color display device, in which the optical element is preferably provided at the outer surface of the display screen. If optical elements which are not color neutral are used in (combination with) such a display device, not only ambient light is reflected in color but also the light produced by the display device itself (for example the light emitted by the phosphors in a color CRT), which is undesirable. Discoloration of the light produced by the display device can generally be compensated for by adapting the beam currents which are used to drive the three (primary) phosphors, however, this rectifies the undesired discoloration only partly and, in addition, leads to an unbalanced ratio between the beam currents and hence to a limited maximum light output, which adversely affects the efficiency of the display device. The advantage of a combination of a light-transmitting layer and a colored coating, which combination has a color-neutral transmission characteristic, is that no additional control of the beam currents is required and that the color reproduction of the display device is improved. The shift, which occurs by combining, in accordance with the invention, the light-transmitting layer with a colored coating having a suitably selected absorption characteristic in the optical element, leads to an improvement of the transmission spectrum of the optical element, so that the light emitted by the phosphors in the display device has an improved color neutrality. In other words, the colored coating reduces the discoloration of the light emitted by the display device, which discoloration is caused by the light-transmitting layer.

These and other aspects of the invention will be apparent from and elucidated with reference to the embodiments described hereinafter.

BRIEF DESCRIPTION OF THE DRAWINGS

In the drawings:

FIG. 1A is a partly cut-away view of a display device comprising a cathode ray tube;

FIG. 1B is a cross-sectional view of a detail of FIG. 1A;

FIG. 1C is a cross-sectional view of a liquid-crystal display device;

Figure 2A:
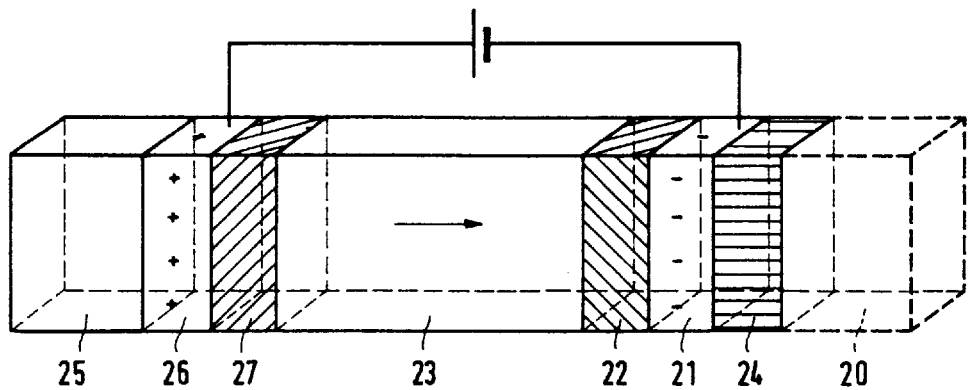
FIG. 2A is a partly perspective view of an example of an optical element comprising a combination of a light-transmitting layer, which includes an electrochromic element, and a colored coating in accordance with the invention.

The Figures are purely schematic and not drawn to scale. In particular for clarity, some dimensions are exaggerated strongly.

DESCRIPTION OF THE PREFERRED EMBODIMENTS

FIG. 1A is a schematic, cut-away view of a display device comprising a cathode ray tube 1 having a glass envelope 2 including a display screen 3, a cone 4 and a neck 5. An electron gun 6 for generating one or more electron beams is situated in said neck. The electron beam is focused on a phosphor layer 7 on the inner surface of the display screen 3 and is deflected across said display screen 3 in two mutually perpendicular directions by means of a deflection coil system (not shown in FIG. 1A). On the outer surface, the display screen 3 is provided with an optical element 8 in accordance with the invention. In an alternative embodiment, the display device of FIG. 1A comprises a flat-type display device.

FIG. 1B is a cross-sectional view of a detail of FIG. 1A, in which a phosphor layer 7 comprises a regular pattern of electroluminescent spots 9R, 9G, 9B. Said spots 9R, 9G, 9B each contain a suitable phosphor of the right color: red 9R, green 9G or blue 9B. Preferably, the outer surface of the display screen 3 is provided with an optical element 8 having a variable transmission. Element 8 at least comprises a material whose transmission properties in the visible region vary as a result of variations in ambient light. The invention is important, in particular, for optical elements which serve to reduce the transmission of light, and which comprise an electrochromic element or a photochromic element.

FIG. 1C is a schematic, cross-sectional view of a liquid-crystal color display device (LCD) having a number of liquid-crystal cells 10 for displaying colors, which display device comprises a liquid-crystalline layer 11 which is sandwiched between two electrode substrates 12, 13. The electrodes on the substrates 12, 13 are not shown in the Figure. Besides, for convenience, only one liquid-crystal cell 10 is shown. In this case, the device comprises two-polarizers 14, 15. Ambient light can enter the LCD both at the outer surface of polarizer 14 and at the outer surface of polarizer 15. In FIG. 1C, the ambient light $L_i$ is incident on the outer surface of polarizer 14; in this case, an optical element 8, as described hereinabove, is provided on the outer surface of polarizer 14.

In order to be able to react rapidly to variations in the intensity of ambient light, a change in the transmission of the light-transmitting layer of the optical element as a result of a variation in the intensity of ambient light, takes place in less than 5 minutes, preferably less than 1 minute. Preferably, the light-transmitting layer (in the state in which the transmission of the light-transmitting layer is high) is insensitive to luminous flux densities below 100 lux.

FIG. 2A is a very schematic, partly perspective view, of an example of an optical element comprising a combination of a light-transmitting layer having an electrochromic element and a colored coating 24 in accordance with the invention. Said electrochromic element includes two half cells, which are interconnected ("laminated") via a (polymeric) electrolyte 23. The first half cell comprises a transparent substrate 20, for example glass, a transparent conductor 21, for example ITO (indium tin oxide) and an electrochromic layer 22, for example, of $WO_3$ or a mixture of $WO_3$ and $V_2O_5$ or mixtures of other suitable materials, which layer is also referred to as work electrode. The second half cell comprises a transparent substrate 25, for example glass, a transparent conductor 26, for example ITO, and a so-called ion-storage layer 27, also referred to as counter electrode. A voltage difference is applied between the transparent conductors 21 and 26. In FIG. 2A, substrate 20 is shown in dotted lines because said layer is generally omitted. The counter electrode 27 is generally responsible only for storing and releasing guest atoms, such as hydrogen and alkali-metal atoms such as $Li^+$ions, and usually does not contribute, or only to a small extent, to the change in color of the electrochromic element (for example if the counter electrode 27 contains the material $V_2O_5$). The ion conductor is responsible for a rapid transfer of the guest ions and, preferably, has a high resistance to electroconduction by electrons. The metal oxides in the electrochromic layer 22 serve to ensure that the transmission properties, upon applying a voltage difference across the element, undergo a reversible change from (colorless) transparent to dark-colored (generally not color neutral). The two half cells are laminated via a polymeric electrolyte 23, which contains, for example, a mixture of poly-ethylene-oxide (peo) and poly-methyl-metha-acrylate (pmma) and a specific quantity of $LiClO_4$. The thickness of the polymeric electrolyte 23 is approximately 10 µm, and the movement of the ions in the polymeric electrolyte is indicated by the arrow in FIG. 2A.

The colored coating 24 may alternatively be composed of an assembly of various layers, which together have the desired absorption characteristic. A preferred embodiment of the optical element in accordance with the invention is characterized in that the light-transmitting layer (22, 23, 27) comprises an electrochromic element, which electrochromic element includes an electrolyte (23) which comprises the colored coating, the transmission of said electrochromic element varying as a result of the application of a voltage difference across said electrochromic element. Incorporation of the electrolyte (23) of the electrochromic element in a liquid has the additional advantage that the colored coating can be added to this liquid, for example, by dissolving the material which forms the colored coating in the liquid or by suspending the colored coating in the liquid. In a further, preferred embodiment of the optical element in accordance with the invention, the (glass) substrate(s) 20 and/or 25 comprise(s) the colored coating. In alternative embodiments of FIG. 2A, the colored coating 24 is incorporated on the other side of the transparent substrate 20 or between the transparent substrate 25 and the light-transmitting conductor 26. If the substrate 20 is omitted, such as in display devices, the colored coating may also be used as a protective layer for the transparent conductor 21. It is desirable to incorporate the colored coating 24 in the optical element at such a location that the layer is closest to the surface where ambient light enters. This has the advantage that the specular reflections are reduced effectively, which reflections occur at the interfaces between layers (for example between 21 and 22, between 22 and 23, between 23 and 27, between 27 and 26 and between 26 and 25) as a result of ambient light.

Figure 2B:
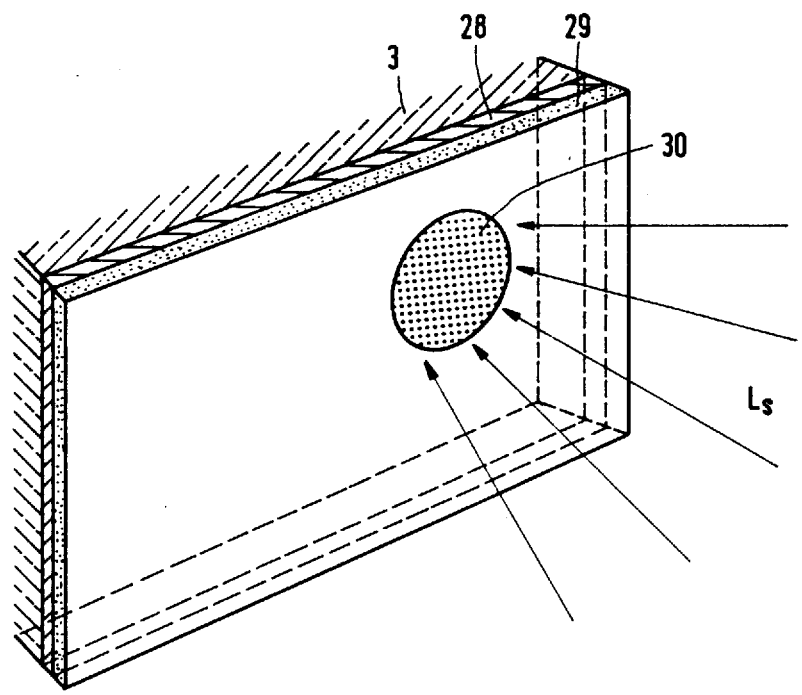
FIG. 2B is a partly perspective view of an example of an optical element comprising a combination of a light-transmitting layer, which includes a photochromic layer, and a colored coating in accordance with the invention.

FIG. 2B is a very schematic, partly perspective view of an example of an optical element comprising a combination of a light-transmitting layer including a photochromic layer 28 and a colored coating 29 in accordance with the invention, which is provided on a display device, the outer surface of display screen 3 being provided with an optical element comprising said photochromic layer 28. A light spot 30 originating from the environs of the display device impinges on a part of the display screen. Radiation $L_s$, which causes said light spot 30, can originate, for example, from sunlight which enters directly or indirectly, whether or not through a window, and impinges on a part of the display screen. Said light spot 30 may alternatively originate from another source of radiation in the area surrounding the display device, for example a lamp. In FIG. 2B, a circular light spot 30 is shown. Said light spot 30 may have any shape and illuminate a part of the display screen or the entire display screen of the display device. Said light spot 30 may alternatively consist of various light spots. In particular, the intensity of light spot 30 on the display screen may differ from place to place. At the location of light spot 30, the contrast of the image reproduced on the display screen 3 of the display device may be reduced substantially as a result of the intensity of said light spot 30. A characteristic of the photochromic layer 28 is that the transmission of the layer 28 decreases automatically at the location of the light spot 30, which results in an increase of the contrast at the location of the light spot 30.

The colored coating 29 may alternatively be composed of an assembly of various layers which together have the desired absorption characteristic. In a further preferred embodiment of the optical element in accordance with the invention, . . . the (glass) display screen 3 comprises the colored coating.

Figure 3A:
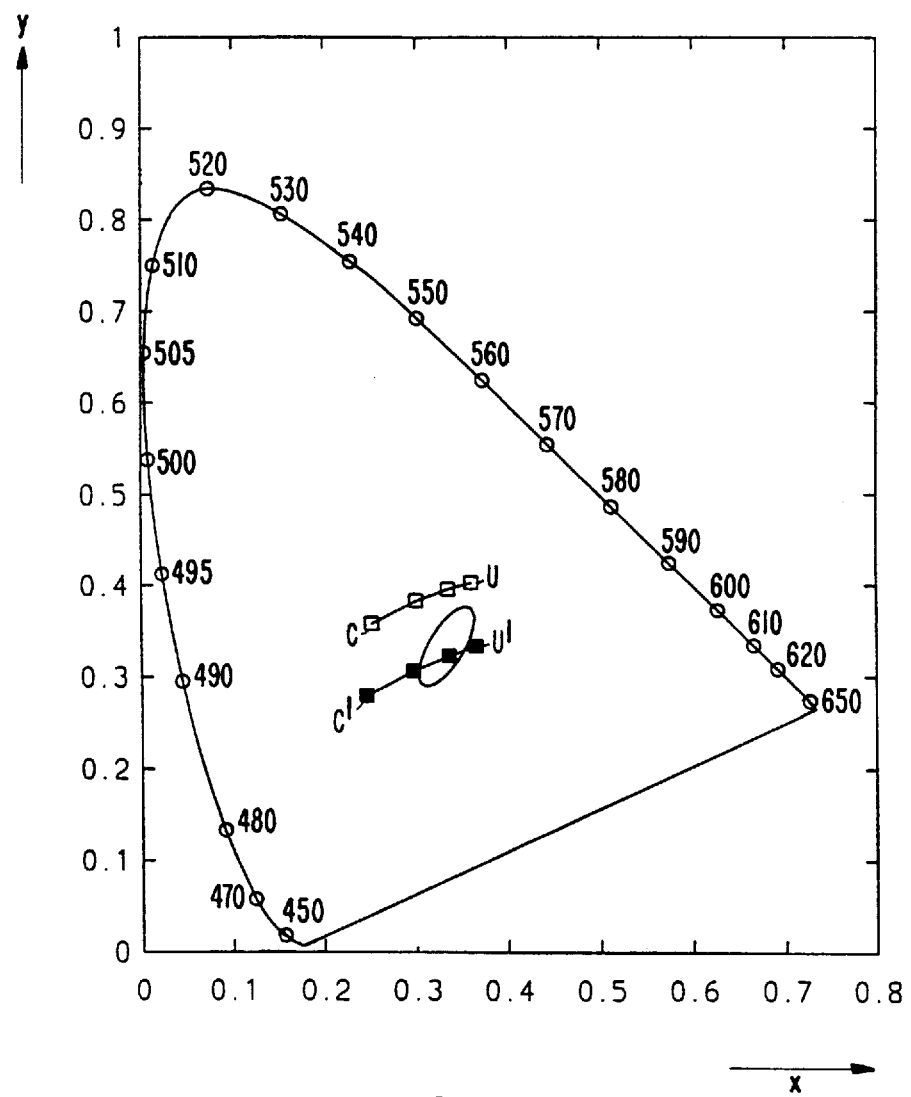
FIGS. 3A and 3B show, in an C.I.E. 1931 color triangle, the color coordinates (x;y) of an optical element which comprises a known light-transmitting layer, and of an optical element in accordance with the invention which comprises a combination of the known light-transmitting layer and a colored coating.

FIG. 3A shows in an C.I.E. 1931 color triangle, the color coordinates (x;y) of an optical element comprising a known light-transmitting layer, and the color coordinates (x; y) of an optical element in accordance with the invention comprising a combination of the known light-transmitting layer and a colored coating. The numbers which correspond to the circles on the edge of the color triangle correspond to the wavelengths of monochromatic visible light in nm. The so-called "white" point (not shown in the Figure) is the point in the center of the color triangle, which corresponds to a color coordinate of (0.333;0.333). In the Figure, the elliptical area around the "white" point corresponds to the so-called "white" area, the major axis terminating in (0.30;0.28) and (0.36;0.38), and the eccentricity, i.e. the ratio of the length of the major axis to the length of the minor axis, ranging between 2 and 3. The major axis of this ellipse makes an angle of approximately 58° with the positive x axis in the color triangle. The length of the major axis is approximately twenty times the length of the major axis of the corresponding, so-called MacAdam ellipse around the "white" point (0.333;0.333), which ellipse has an eccentricity of approximately 2.6.

In the example of FIG. 3A, the color points interconnected via the line c–u correspond to the color coordinates of a photochromic layer which comprises a spiro-oxazine, the transmission characteristic of which varies as a function of the intensity of incident ambient light between an uncolored (u) state, corresponding to a light intensity of less than 100 lux, and a colored (c) state, the spiro-oxazine being of a blue color. In this example, the uncolored state (u) of the photochromic layer is relatively close to the "white" area, whereas the colored state (c) is relatively remote from the "white" point, so that, in particular in the colored state, the photochromic layer combines a low transmission with a relatively strong color (in this example: blue). The incorporation of a colored coating (in this example a rhodamine-B Zapon violet) in the optical element, the color coordinates of said colored coating in the C.I.E. 1931 color triangle being an approximate mirror image of the "white" point, causes the line c–u, which interconnects the color points of the light-transmitting layer, to move towards the line c'–u', which interconnects the color points of the combination of the light-transmitting layer and the colored coating. A suitable choice of the absorption characteristic of the colored coating causes, the line c'–u' to intersect the "white" area, which leads to an improved color neutrality of the optical element.

Figure 3B:
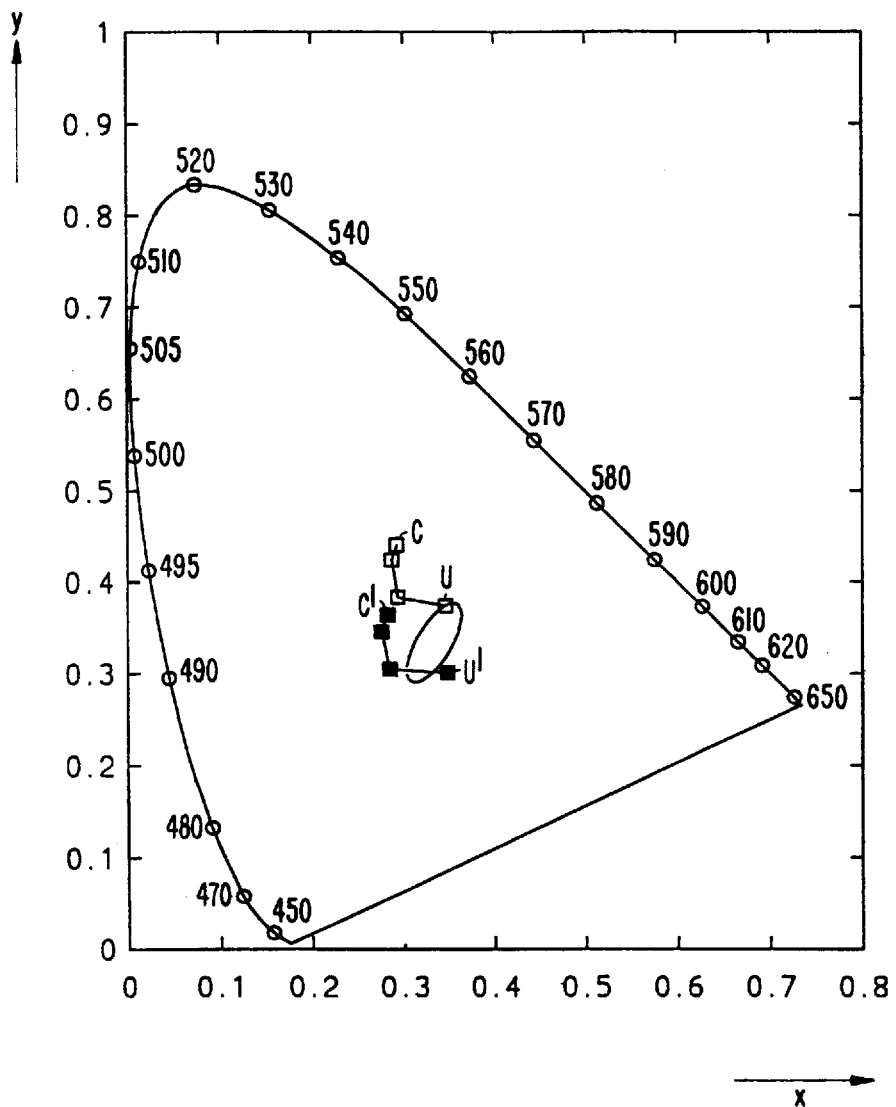

FIG. 3B shows, in an C.I.E. 1931 color triangle, the color coordinates (x;y) of an optical element comprising a known light-transmitting layer, and the color coordinates (x;y) of an optical element in accordance with the invention, comprising a combination of the known light-transmitting layer and a colored coating.

In the example of FIG. 3B, the color points which are interconnected via the line c–u correspond to the color coordinates of an electrochromic element comprising a $WO_3/Li^+/V_2O_5$ electrochromic cell, the transmission characteristic of which varies as a function of the intensity of incident ambient light between an uncolored (u) state (usually referred to as "bleached" for an electrochromic element), which corresponds to a light intensity of less than 100 lux, and a colored (c) state. In this example, the uncolored state (u) of the electrochromic layer is relatively close to the "white" area, whereas the colored state is slightly further removed from the "white" point, so that, in particular, in the colored state the photochromic layer combines a low transmission with a color (in this example: a bluish-green color). The incorporation of a colored coating (in this example referred to as rhodamine-B Zapon violet) in the optical element, the color coordinates of said colored coating in the color triangle being an approximate mirror image of the "white" point, causes the line c–u, which interconnects the color points of the light-transmitting layer, to shift towards the line c'–u', which interconnects the color points of the combination of the light-transmitting layer and the colored coating. A suitable choice of the absorption characteristic of the colored coating causes the line c'–u' to intersect the "white" area, which leads to an improved color neutrality of the optical element. As the transmission characteristic of the light-transmitting layer covers a relatively small area in the color triangle, the color neutrality of the optical element is improved considerably. If desirable, a further improvement of the color neutrality of the optical element in a display device can be achieved by a small adaptation of the beam currents.

Given the transmission characteristic of the light-transmitting layer, the absorption characteristic of the colored coating is determined and suitable materials are selected. An example of a suitable, absorbing material is a material containing rhodamine-B (and an azo-metal complex dye) referred to as Zapon Violet (color point 0.3322;0.2666), which can be provided on the display screen or on a face plate of a display device by means of a wet-chemical process. Suitable, alternative absorbing materials are materials belonging to the following classes: azos, azo-methines, phthalo-cyanines, anthra-quinones and coumarins. To obtain an optimum color neutrality, it is also desirable to keep the area in the color triangle, which is covered by the light-transmitting layer in its various transmission states, as small as possible.

The choice of the properties of the colored coating relative to the light-transmitting layer in the optical element is based on the following relationship:

$$T(\lambda)_{ltl} \times T(\lambda)_{cc} = \text{const}$$

where $T(\lambda)_{ltl}$ represents the transmission characteristic of the light-transmitting layer (ltl) and $t(\lambda)_{cc}$ represents the transmission characteristic of the colored coating (cc) as a function of the wavelength $\lambda$. An optical element comprising a light-transmitting layer and a colored coating attains an optimum color neutrality if, for all wavelengths visible to the human eye, the transmission characteristic of the light-transmitting layer is the inverse of the transmission characteristic of the colored coating.

By virtue of the combination of a light-transmitting layer and a colored coating, which combination results in a considerably improved color neutrality of the transmission characteristic, an additional control of the phosphors, driven via the beam currents, is not required, and the color reproduction of the display device is improved considerably. In other words, discoloration of the light emitted by the display device is reduced by the colored coating, which discoloration is caused by the light-transmitting layer.

It will be obvious that within the scope of the invention many variations are possible to those skilled in the art. For example, the light-transmitting element may also comprise a liquid-crystal (display) device (LCD, LC-TV and plasma-addressed LCD) or plasma panels or electroluminescent displays (ELD).

In general, the invention relates to an optical element which is provided on a substrate, for example a display screen of a display device, which optical element comprises a light-transmitting layer whose transmission in the visible region varies in response to a change in ambient light. The optical element is characterized in that it further comprises a colored coating which selectively absorbs light in the visible region. The colored coating has such an absorption characteristic that the color coordinates (x;y) of the combination of the light-transmitting layer and the colored coating vary in such a way, as a result of a variation in ambient light, that a line, which interconnects the color coordinates, is partly situated in an elliptical area with achromatic point (0.333;0.333) in the color triangle, which ellipse comprises a major axis and a minor axis, which major axis terminates in (0.30;0.28) and (0.36;0.38) and the eccentricity of which ranges between 2 and 3. Preferably, the line is situated predominantly in the elliptical area. The invention is important, in particular, for optical elements which serve to reduce the transmission of light, and which comprise an electrochromic element or a photochromic element.

I claim:

1. An optical element (8) which is provided on a substrate (3) and which comprises a light-transmitting layer, the transmission of said light-transmitting layer in the visible region varying in response to a change in ambient light, characterized in that the element (8) further comprises a colored coating, which selectively absorbs light in the visible region, and which colored coating has such an absorption characteristic that color coordinates (x;y) of the combination of the light-transmitting layer and the colored coating vary in such a way, as a result of a variation in ambient light, that a line, which interconnects the color coordinates (x;y) in a C.I.E. 1931 color triangle, is partly situated in an elliptical area with achromatic point (0.333;0.333) in the color triangle, which ellipse comprises a major axis and a minor axis, the major axis terminating in (0.30;0.28) and (0.36;0.38), and the ratio of the length of the major axis to the length of the short axis ranging between 2 and 3.

2. An optical element as claimed in claim 1, characterized in that the line, which interconnects the color coordinates (x;y) of the combination of the light-transmitting layer and the colored coating, is situated predominantly in the elliptical area.

3. An optical element as claimed in claim 1, characterized in that the line, which interconnects the color coordinates (x;y) of the combination of the light-transmitting layer and the colored coating, is partly situated in a further elliptical area with achromatic point (0.333;0.333) in the color triangle, the major axis of said further ellipse terminating in (0.315;0.305) and (0.345;0.355) and the ratio of the length of the major axis to the length of the minor axis ranging between 2.3 and 2.9.

4. An optical element as claimed in claim 3, characterized in that the line, which interconnects the color coordinates (x;y) of the combination of the light-transmitting layer and the colored coating, is situated predominantly in the further elliptical area.

5. An optical element as claimed in claim 1, in which the substrate contains glass, characterized in that the substrate comprises the colored coating.

6. An optical element as claimed in claim 1, characterized in that a change in the transmission of the light-transmitting layer as a result of a variation in the intensity of ambient light, takes place in less than 5 minutes, preferably less than 1 minute.

7. An optical element as claimed in claim 1, characterized in that the light-transmitting layer is insensitive to luminous flux densities below 100 lux.

8. An optical element as claimed in claim 1, characterized in that the light-transmitting layer comprises an electrochromic element which includes an electrolyte, the transmission of said electrochromic element varying as a result of the application of a voltage difference across said electrochromic element.

9. An optical element as claimed in claim 8, characterized in that the electrolyte comprises the colored coating.

10. An optical element as claimed in claim 1, characterized in that the light-transmitting layer (28) comprises a photochromic element, which photochromic element includes a layer (28) containing a material whose transmission varies as a result of electromagnetic radiation which is incident on the layer.

11. A display device comprising a display screen and an optical element (8) as claimed in claim 1.

12. A display device as claimed in claim 11, characterized in that the optical element (8) is provided on the outer surface of the display screen.

* * * * *